United States Patent [19]

Koppenstein et al.

[11] Patent Number: 5,002,330
[45] Date of Patent: Mar. 26, 1991

[54] ARRANGEMENT FOR OBTAINING A DESIRED FOLD ARRANGEMENT OF A FOLDING-TOP COVERING OF A FOLDING-TOP

[75] Inventors: Harald Koppenstein, Filderstadt; Jürgen Schrader, Stuttgart, both of Fed. Rep. of Germany

[73] Assignee: Daimler-Benz AG, Fed. Rep. of Germany

[21] Appl. No.: 480,656

[22] Filed: Feb. 15, 1990

[30] Foreign Application Priority Data

Mar. 7, 1989 [DE] Fed. Rep. of Germany ....... 3907227

[51] Int. Cl.$^5$ ................................................ B60J 7/12
[52] U.S. Cl. ..................................... 296/107; 296/116
[58] Field of Search ................. 296/107, 108, 116, 117

[56] References Cited

U.S. PATENT DOCUMENTS 4,529,243 7/1985 Kaltz et al. ........................ 296/107
4,747,635 5/1988 Wagner ............................. 296/107
4,778,215 10/1988 Ramaciotti ....................... 296/107

FOREIGN PATENT DOCUMENTS 3818611 6/1988 Fed. Rep. of Germany ...... 296/107
3726430 9/1988 Fed. Rep. of Germany ...... 296/107
3724532 11/1988 Fed. Rep. of Germany ...... 296/107

*Primary Examiner*—Robert R. Song
*Attorney, Agent, or Firm*—Evenson, Wands, Edwards, Lenahan & McKeown

[57] ABSTRACT

A positively obtained fold arrangement in a folding-top covering of a folding top is controlled by a round-bending fold which extends in the direction of width of the folding-top covering and is stiffened in terms of bending transversely relative to its path. When the folding top is opened, the folding top covering is drawn into its fold form automatically under the tensile force of a tension-spring element, the tension-spring element being held at its ends at the folding-top covering on both sides of the round-bending fold. So that the fold arrangement can be stowed in a space-saving manner next to associated structure parts of the folding top, while at the same time avoiding creases, measure are provided for stiffening the round-bending fold in terms of bending reinforcing measures, thus allowing a relatively sharp bending of the round-bending fold.

12 Claims, 4 Drawing Sheets

ARRANGEMENT FOR OBTAINING A DESIRED FOLD ARRANGEMENT OF A FOLDING-TOP COVERING OF A FOLDING-TOP

BACKGROUND AND SUMMARY OF THE INVENTION

The present invention generally relates to a positively obtained fold arrangement of a folding-top covering for a folding top, and more particularly to a fold arrangement which has the least adverse effect on the dimensions of a storage box for the folding top while protecting against the formation of creases in the folding-top covering.

A fold arrangement of this type is disclosed by German Patent Specification 3,726,430, wherein the fold arrangement extends over the entire roof width in the region of a flexible rear window of a convertible top.

So that the intended fold arrangement forms automatically when the folding top is opened, the folding-top covering is stiffened in the region of a round-bending fold, on both sides of the rear window, by four leaf-spring elements. These leaf-spring elements extend transversely relative to a bending or folding axis of the round-bending fold and are held in a common tubular belt on the rear face of the folding-top covering. At a distance from the ends of the leaf-spring elements, in a second tubular belt, a rubber band is fastened, at its ends, to the folding-top covering and is prestressed as a result of longitudinal stretching.

The bending elasticity of the leaf-spring elements and the compression tension of the rubber band are so coordinated with one another that, when the folding top is opened, the surface region of the folding-top covering stiffened by the leaf-spring elements is deformed under the compression force of the rubber band so as to form a round-bending fold.

When the folding top is in the process of being closed, the round-bending fold is redeformed by longitudinal tensioning forces in the folding-top covering, the leaf-spring elements resuming their straight extended position. The leaf-spring elements, because they extend over the width of the round-bending fold, ensure that, when the folding top is stowed away, no sharp creases can occur in the folding-top covering which give the folding-top fabric an unsightly appearance even after only a short period of service. Since the rear window acts as a surface stiffening of the folding-top covering, the outwardly curved round-bending fold at the same time assists in the formation of an inwardly curved connecting bending fold.

Protection against sharp creases in the surface of the connecting bending fold is also afforded to a certain extent by the elastic behavior of the rear window. However, for this, the bending radius of the connecting bending fold has to be made large and has to be maintained even when the folding top is retracted.

Even though the middle region of the folding-top box, assigned for storing to the folding top, may have a sufficient accomodation space for a bending folding of the folding-top covering with a large radius of curvature, this will scarcely be available in the side-wall region of the folding top.

Since the folding-top covering has to be stowed away in the side-wall plane between the side-wall structure parts, transferring the above-noted round-bending fold principle to the side wall of the folding-top covering would require a considerable widening of the lateral legs of the folding-top box, thus reducing the seat width of a rear-seat bench.

In particular, guiding the folding-toP fabric closely round the side-wall structure parts would not be directly possible because of the rubber band stretched on the inside of the folding-top covering. Also, the leaf-spring elements cannot be shortened as required, and therefore even an accumulation of a plurality of round-bending folds with a relatively small fold depth can scarcely be obtained according to the above-noted functional principle.

These problems arise to an even greater extent when the side-wall regions of the folding-top covering are extremely long, as occurs, for example, in the folding top disclosed by German Patent Specification 3,724,532. During the operation of retracting this folding top, beyond the existing length of the folding-top covering in the side-wall region, there is also a shifting movement of the fabric-holding bar retaining the folding-top fabric in the rear circumferential region, accompanied by a reduction in length of a lateral leg of the fabric-holding bar.

As a result, the folding-top fabric cannot be secured over an entire side-wall length, and therefore it has to be stiffened considerably in the region of its unsecured length. This leads, during folding, to an uneven distribution of the folding resistance over the height of the side-wall surface of the folding-top covering.

For the reasons explained, an object on which the invention is based is to improve a fold arrangement of the relevant generic type, to the effect that it has the least possible adverse effect on the dimensions of the folding-top box assigned to the folding top, whilst protection against the formation of creases is to be maintained.

The solution according to preferred embodiments of the present invention for achieving this object and other object emerges from the use of reinforcing measures, taken on a folding top covering, which allow for a relatively shape bending of the round-bending fold. Because of improved flexibility, the round-bending fold or a plurality of round-bending folds extending next to one another can be folded relatively flat, without creases occurring. The top can thereby be stowed, in extremely space-saving way, close next to structure parts of the folding-top structure.

Preferably, the round-bending fold is stiffened by means of measures which, in any case, are necessary in terms of construction or stylistically desirable.

An especially flat round-bending fold is obtained if the round-bending fold is drawn into an S-shaped form by pulling means, since the tension band can thereby rest supportively over its entire length against the folding-top covering on the wide side.

Other objects, advantages and novel features of the present invention will become apparent from the following detailed description of the invention when considered in conjunction with the accompanying drawings.

DETAILED DESCRIPTION OF THE DRAWINGS

Figure 1:
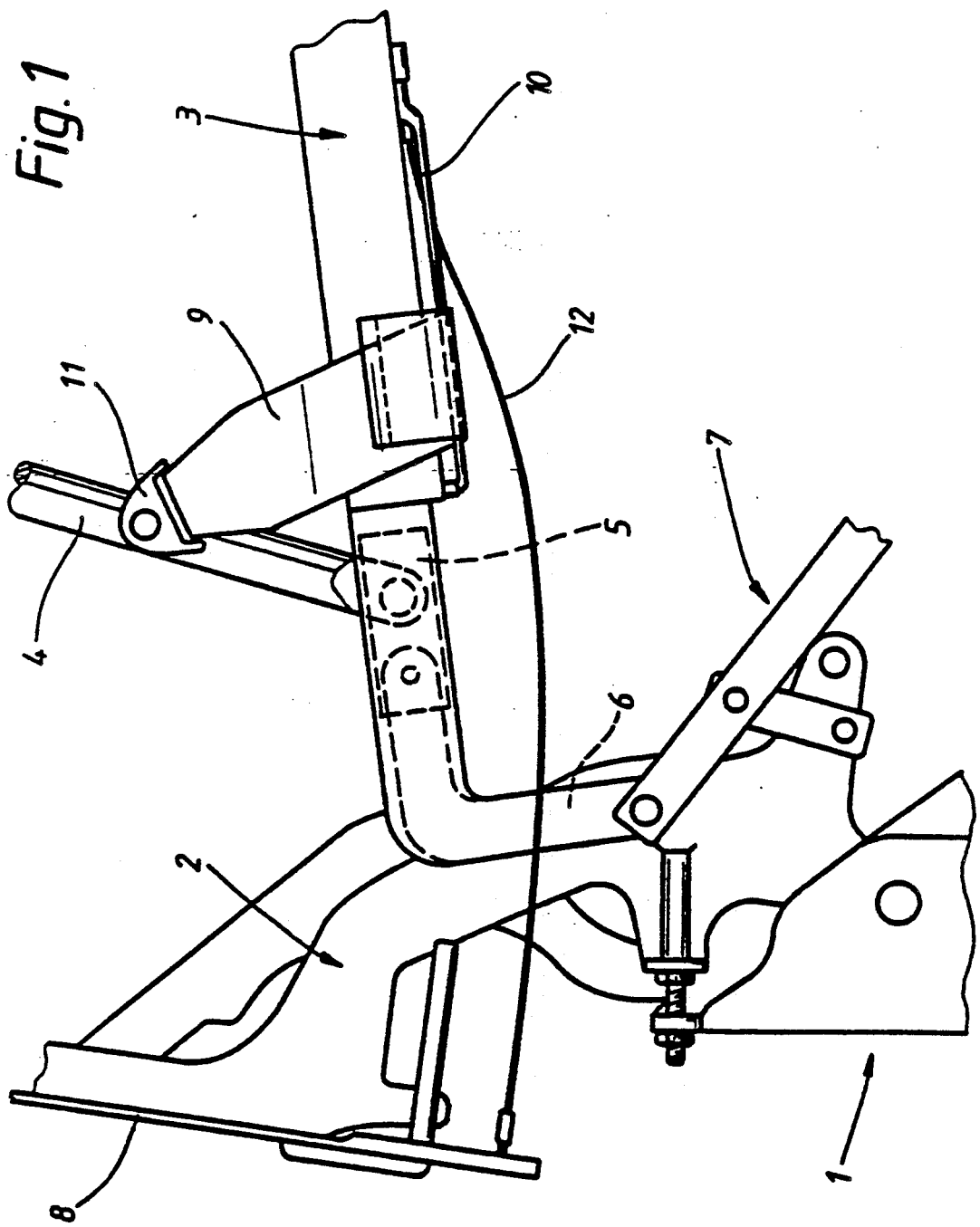
FIG. 1 shows a side-wall region of a folding-top structure of a folding top.

An exemplary embodiment of the invention is explained in detail below with reference to the drawing representations provided by FIGS. 1-4.

A known folding-top structure of a folding top for convertibles, which, when the top is opened, is retracted into an associated folding-top box, is shown, in FIG. 1, only in a side-wall region necessary for understanding the present invention. Moreover, for the sake of simplification, because of the mirror-symmetrical design of the folding top, the present invention is illustrated and explained only in terms of one side of the folding top.

All the lateral structure parts of the folding top are at least indirectly fastened in a centrally pivotable manner to a bracket 1 countersunk in a side board of the vechicle in front of a lateral leg of a U-shaped folding-top box. A vertical folding-top column 2, an associated lateral leg of a generally U-shaped fabric-holding bar 3 and one flank of a rearwardly inclined corner bow 4 are to be seen as structure elements retaining the folding-top covering (not shown in FIG. 1) in the side-wall region.

The lower end of the corner bow 4 is articulated on a sliding block 5 which is mounted on the fabric-holding bar 3 so as to be displaceable in the longitudinal direction of the latter. Also articulated on the sliding block 5 is an L-shaped angled lever 6 which, because its opposite end is fastened in an articulated manner to the folding-top column 2, couples the sliding block 5 to the swinging movement of the latter. Furthermore, the fabric-holding bar 3 is fastened to the bracket 1 and to the folding-top column 2 via a rod mechanism 7, thereby resulting in a longitudinal advance of the fabric-holding bar 3 during an operation of retracting the folding top into an associated folding-top box for storing the folding top.

As a result of this longitudinal advance, the folding top covering cannot be secured to the leg of the fabric-holding bar 3 directly over the visible length region, but only in the rear length region which is curved arcuately in the direction of width of the folding top. Because of this curvature, it is also impossible, with the folding top closed, to tension the cover freely with a smooth surface in the side-wall plane, since it is fixed at the front by a fabric-holding rail 8 attached to the outside of the folding-top column 2.

To ensure that the folding-top covering is nevertheless stretched tautly in the side-wall plane, there is the provision of a belt band 9 which, with the folding top closed, draws the folding-top fabric downwards, thereby ensuring diagonal bracing.

The arrangement of this belt band 9 per se is disclosed from German Patent Specification 3,818,616. The belt band 9 is, for example, an elastomerically longitudinally stretchable band, one end region of which is sewn to the inner face of the folding-top fabric looped around a sliding rod secured to the fabric-holding bar 3 underneath the latter 10. The opposite end region of the belt band 9 is secured with the height offset to the corner bow 4 via a frame bar 11. The securing point is selected so that, during the pivoting of the corner bar 4 into the plane of the fabric-holding bar 3, the belt band 9 is shifted rearwards along the sliding rod of the deflecting bar 10 as a result of the change in pulling direction of the belt band 9.

In addition to the belt band 9, there is also provided, as tautening arrangement, a cable-pull arrangement which, with the folding top closed, ensures that the so-called folding-top flap bears firmly on the top edge of the associated sideboard of the vehicle body. For this, a thin sheathed wire cable 12 is suspended in the region near the lower end of the fabric-holding rail 8, and its second end is connected to the fabric-holding bar 3 behind the deflecting bar 10. The length of the wire cable 12 is such that it is stretched tautly when the folding top is closed. By connection means between the mutually opposite edge zones of the folding-top fabric, the latter is also fixed after the tensioning operation as a result of a transverse advance of the wire cable 12.

When the fabric-holding bar 3 is pivoted upwards slightly, as shown in FIG. 1, the wire cable 12 slackens immediately, thereby affording the preconditions for a controlled folding operation of the folding-top covering in this surface region.

Figure 2:
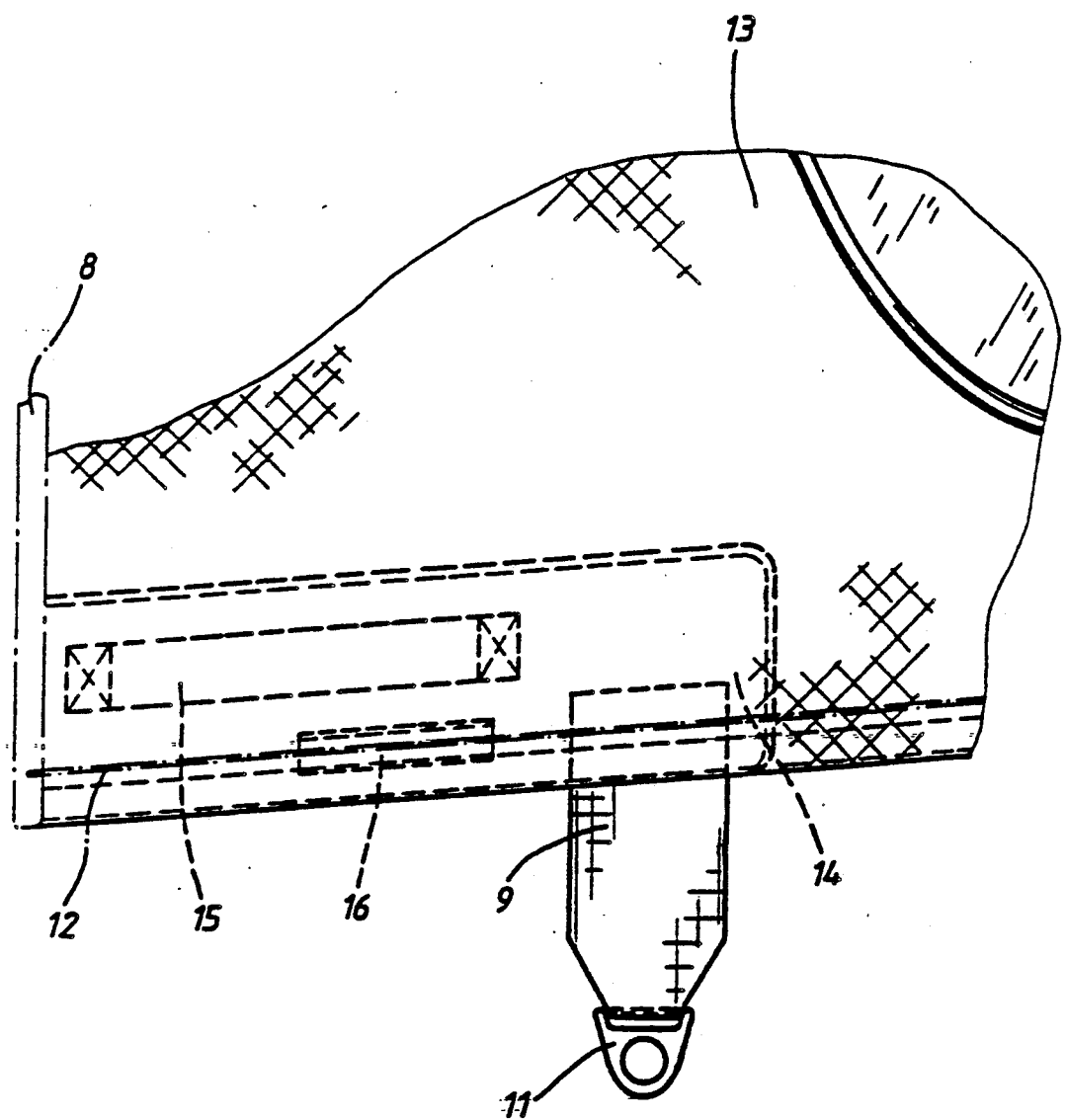
FIG. 2 shows a separate side view of a folding-top covering in the side-wall region according to FIG. 1.

So that the desired fold arrangement can also be achieved in this surface region, a plurality of reinforcing measures are carried out on the folding-top covering 13, as shown in FIG. 2, these acting as surface stiffenings and complementing one another so as to obtain an overall effect.

As one reinforcing measure, the folding-top covering 13 is doubled along a lower edge portion, that is to say two layers of folding-top fabric rest on one another over their surface and are connected to one another in an invisible way. This invisible reinforcing measure can extend from the fabric-holding rail 8 over the entire unsecured length of the folding-top covering 13. The width of this strip should cover the leg of the fabric-holding bar 3 in a vertical direction, thus substantially reducing creasing.

A protective overlay 14 made of, for example, leather is sewn onto the inner face of this above-noted doubled length portion of the folding-top covering 13. This protective overlay 14 will likewise have a wear-inhibiting effect and prevent pressure points in the folding-top fabric 13 along an especially critical length region from the fabric-holding rail 8 to the deflecting bar 10. Accordingly, it is designed as, for example, a rectangular leather tab which extends at the front as far as the fabric-holding rail 8, at the rear approximately as far as the middle of the deflecting bar 10, at the bottom as far as the terminating edge of the folding-top covering 13 and at the top beyond the width extent of the fabric-holding bar 3.

An elastic member, such as, for example, a rubber band 15, prestressed by longitudinal stretching and extending in a longitudinal direction of the protective overlay 14, is fastened to the latter approximately in the middle of its width. The prestressed rubber band 15 is sewn only at its ends to the protective overlay 14, one of the fastened ends being fastened at a short distance behind the fabric-holding rail 8 and the other rear end of the rubber band 15 being fastened in front of the belt band 9 likewise sewn onto the protective overlay 14.

Also, a loop guide 16 made of, for example, leather is sewn onto the protective overlay 14 in a middle region of the latter underneath the rubber band 15. This likewise horizontally extending loop guide 16 constitutes the means of connection to the folding-top covering 13 when the wire cable 12 is passed through it.

Figure 3:
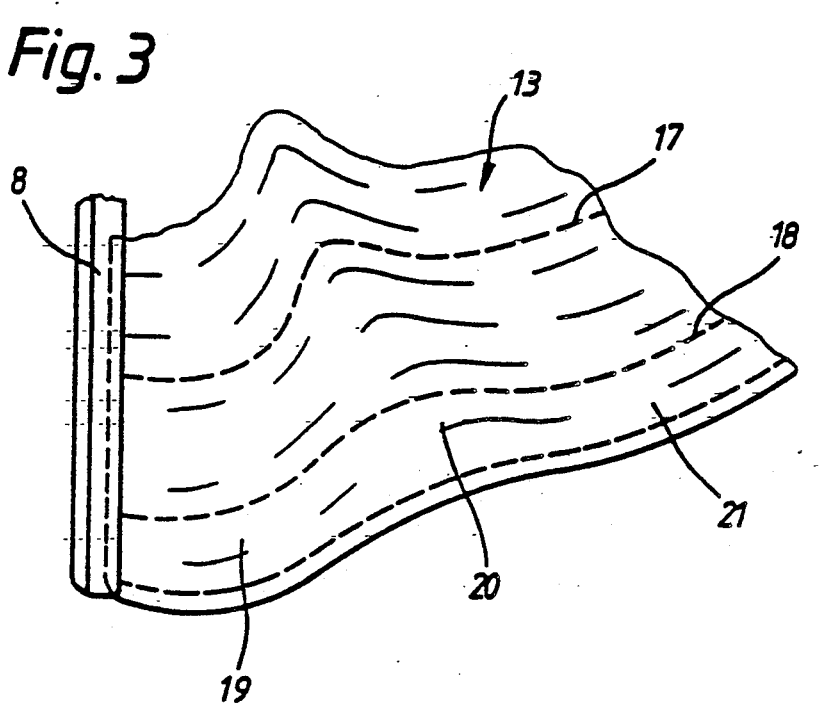
FIG. 3 shows a fold arrangement in the side-wall region of the folding top, with the fabric-holding bar raised somewhat.

As can be seen clearly in conjunction with FIG. 3, two longitudinal seams 17 and 18, extending in the longitudinal direction of the folding-top covering 13, are provided at a distance from one another as an additional stiffening measure.

Referring again to FIG. 3, it can also be seen how the desired fold arrangement is established when the fabric-holding bar 3 is pivoted upwards slightly. Thus, there first forms, behind the fabric-holding rail 8, a slightly inwardly curved round-bending fold 19 which merges into a round-bending fold 20 likewise curved only slightly outwards. Behind the round-bending fold 20, there is, again, an inwardly curved connecting bending fold 21 of which the bend is flat in approximately the same way as that of the round-bending fold 19. This fold arrangement occurs because the tensile forces of the belt band 9 are superposed on the tensile forces of the rubber band 15.

The rubber band 15, as a result of its arrangement, would per se endeavour, by compression, to draw the folding-top covering 13 into a round-bending fold which would be located exactly between its sewn ends.

Because of the specific surface stiffening of the folding-top covering 13 in conjunction with the inwardly directed inclination of the belt band 9, however, the stiffened surface region is influenced at the same time by bulging forces which are effective in the stiffened surface and which counteract the curvature of the folding-top fabric possible as a result of the rubber band 15. Because of this, the inwardly directed round-bending fold 19 and the half round-bending fold 20 form over the length spanned by the rubber band 15.

Figure 4:
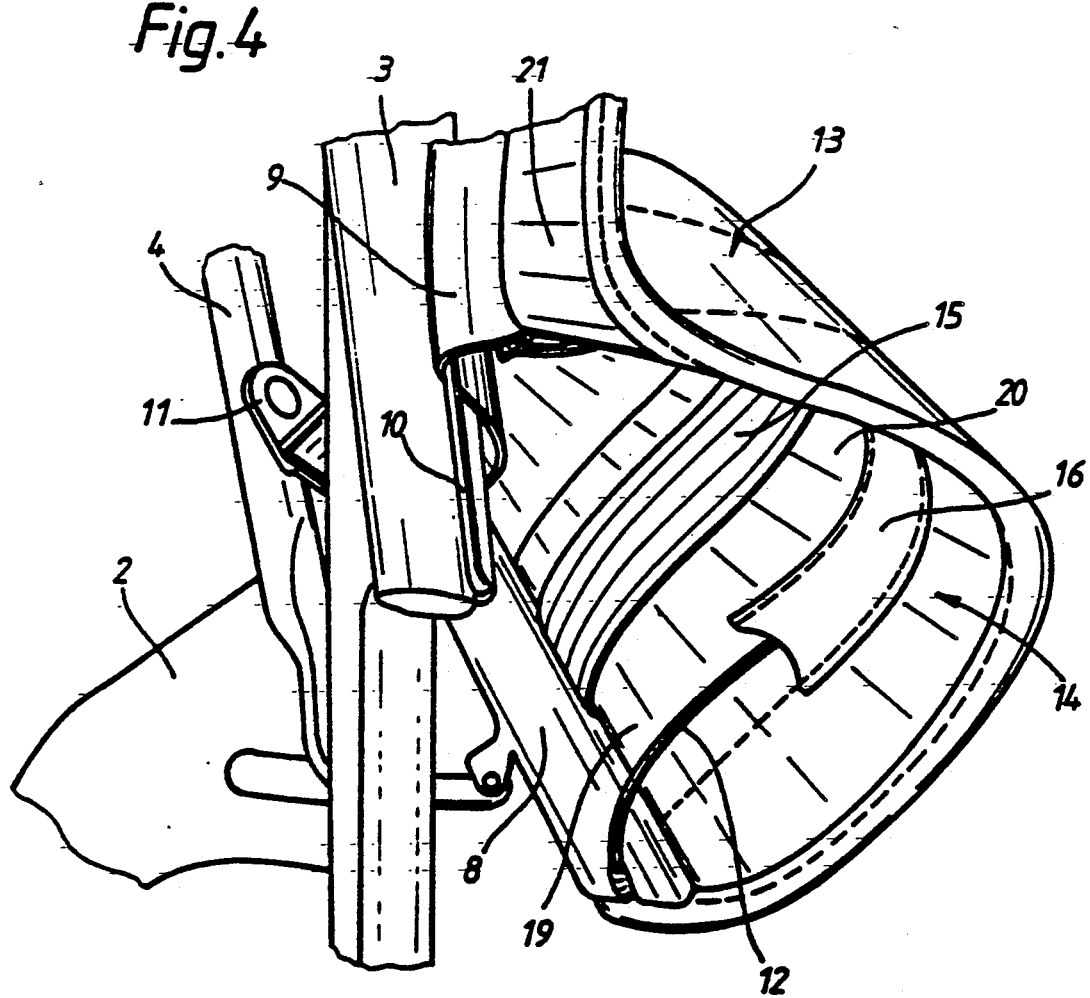
FIG. 4 shows an inner view of the fold arrangement according to FIG. 3, with the fabric-holding bar 5 erected.
Figure 5:
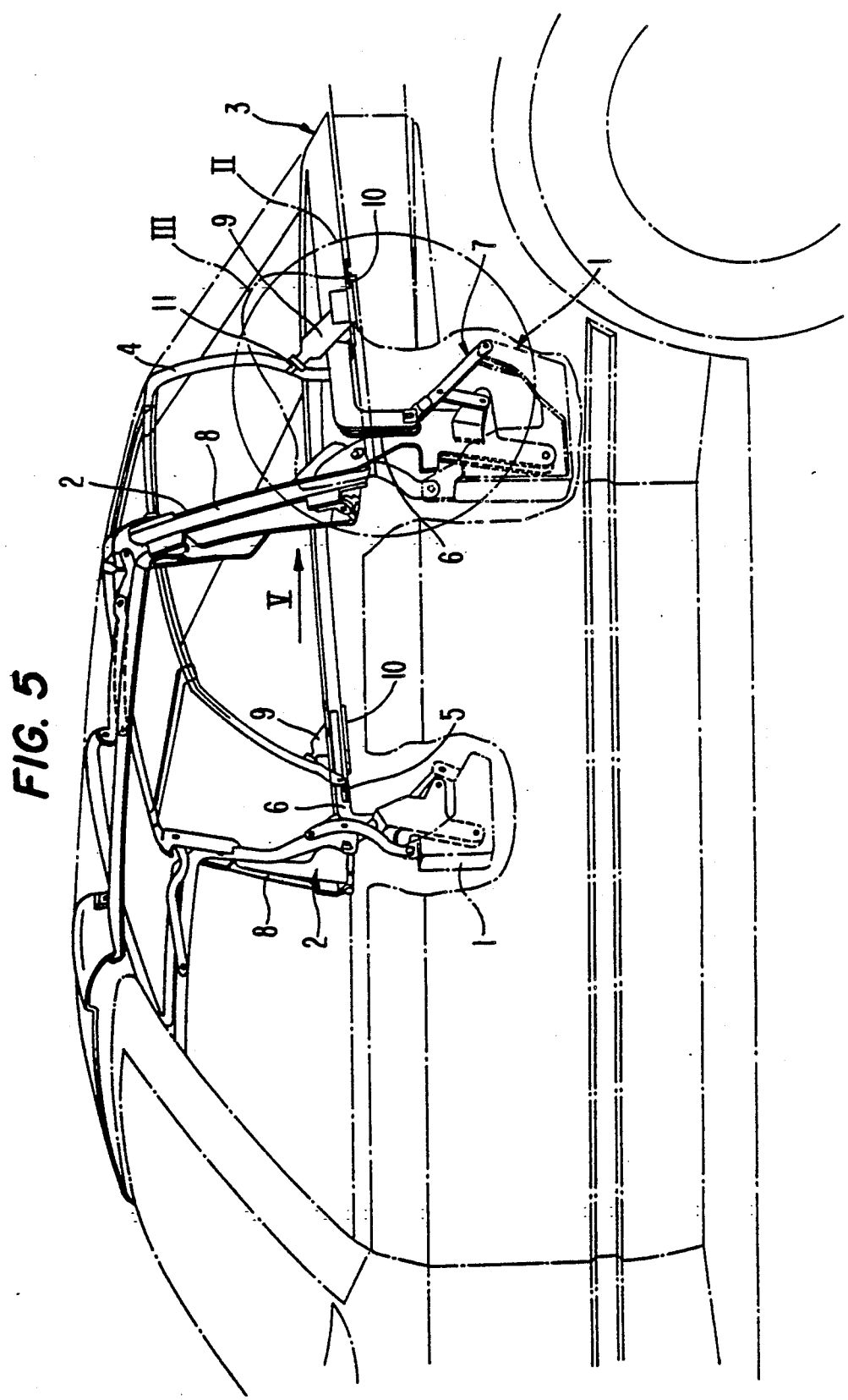
FIG. 5 is a perspective view of the folding-top structure of the present invention shown in FIG. 1 in a generally known convertible arrangement with the folding top in the closed position.

As can be seen in conjunction with FIG. 4, the outwardly curved round-bending fold 20 in particular increases considerably when, in order to retract the folding top, the fabric-holding bar 3 is pivoted into an intermediate position, in which it is located approximately in one width plane with the erected folding-top column 2 of the main bow. During the upward pivoting of the fabric-holding bar 3, the corner bow 4 is pivoted into the width plane of the latter.

Because of the associated pull of the corner bow 4 on the belt band 9 in the rearward direction in relation to the longitudinal extension of the fabric-holding bar 3, the belt band 9 slides upwards on the deflecting bar 10. The reduction in distance between the fabric-holding rail 8 and the holding point of the belt band 9 occurring during the upward pivoting of the fabric-holding bar 3 can be compensated only partially by the vertical advance of the holding point.

Despite the fact that the round-bending fold 20 is relatively protrusive in the lateral direction, the folding top can easily be lowered into a folding-top box with narrow lateral legs, since the fold arrangement, when it passes through the orifice of the folding-top box, flattens automatically by running onto the side-board top edge of the vehicle body and at the same time mates extremely closely with side-wall structure parts. Since the rubber band 15 bears over its entire length on the folding-top fabric on the wide side, it supports the round-bending fold 19, at which creases form especially easily during the retraction operation in every bending position, from the inside. As regards the round-bending folds 20 and 21, the existing stiffening measures are sufficient to prevent the formation of creases despite narrow being radii.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for obtaining a desired fold arrangement of a folding-top covering of a folding top including a top frame having a fabric-holding bar coupled to a corner bow pivotable into a plane of the fabric holding bar, the folding top being moveable between opened and closed positions, comprising:
   a round-bending fold, formed from the folding-top covering, for controlling the formation of the desired fold arrangement, a folding axis of the round-bending fold extending in a direction of width of the folding top covering;
   a tension-spring element for drawing the folding-top covering into the round-bending fold under a tensile force thereof, the tension-spring element being held at ends thereof on the folding-top covering at both side of the round-bending fold; and
   reinforcing means for stiffening, in terms of bending, the round-bending fold transversely relative to a fold line thereof to allow a relatively sharp bending of the round-bending fold.

2. An arrangement according to claim 1, wherein the reinforcing means comprises several folding-top fabric layers connected to one another over their area.

3. An arrangement according to claim 2, wherein the reinforcing means further includes at least one of trimming and seams extending, in a region of the round-bending fold, transversely relative to the bending axis thereof.

4. An arrangement according to claim 1, wherein the reinforcing means comprises at least one of trimming and seams extending, in a region of the round-bending fold, transversely relative to the bending axis thereof.

5. An arrangement according to claim 1, wherein, in a surface region of the round-bending fold, the reinforcing means comprises an abrasion-resistant protective overlay.

6. An arrangement according to claim 1, wherein a loop guide for a thin wire cable held on both sides of the round-bending fold is provided at the folding-top covering so as to extend in a direction of width of the round-bending fold.

7. An arrangement according to claim 1, wherein, during an opening movement of the folding top, the round-bending fold is drawn into an inwardly directed fold form by a pulling means, and in each bending, position of the round-bending fold, the round-bending fold is maintained in its form by a tension-spring element resting against the folding-top covering in a longitudinally stabilizing manner.

8. An arrangement according to claim 7, wherein the pulling means is a belt band, of which one end is connected to a reinforced region of the folding-top covering and the other end is connected to a structure part, and wherein the belt band has a resiliently stretchable length region.

9. An arrangement according to claim 1, wherein round-bending folds are provided in a mirror-symmetrical arrangement at each side-wall region of the folding top, are each situated in a region near a lower terminating edge of the folding top and are each located at a largely unsecured length region of the folding-top covering.

10. An arrangement according to claim 9, wherein the unsecured length of the folding-top covering is reduced by means of a belt band which, being deflected on an associated leg of a fabric-holding bar, is motionally coupled to a corner bow pivotable into the plane of the fabric-holding bar, with the result that, during a retraction of the folding top, the belt band is drawn along the leg of the fabric-holding bar rearwards in relation to its longitudinal extension, and wherein connection of the belt band to the folding-top covering is selected in such a way that the belt band participates as a pulling means in the formation of the round-bending fold.

11. An arrangement according to claim 10, wherein the reinforcing means of the round-bending fold extends continuously over a connecting bending fold, and wherein the belt band is connected to the folding-top covering at the connecting bending fold.

12. An arrangement according to claim 1, wherein a rubber band prestressed by longitudinal stretching is provided as the tension-spring element.

* * * * *